United States Patent
Price

[19]

[11] Patent Number: 5,913,270
[45] Date of Patent: Jun. 22, 1999

[54] PORTABLE MODULAR FIELD KITCHEN

[76] Inventor: Walter L. Price, 1229 E. Gary Cir., Mesa, Ariz. 85203

[21] Appl. No.: 09/124,368

[22] Filed: Jul. 29, 1998

[51] Int. Cl.⁶ .................................................. A47B 57/00
[52] U.S. Cl. .......................... 108/101; 108/99; 108/152; 108/192; 211/187; 211/201
[58] Field of Search ............................. 108/192, 99, 101, 108/180, 152, 157.13, 158.11; 211/201, 186, 187, 189, 181.1

[56] References Cited

U.S. PATENT DOCUMENTS

| | | | |
|---|---|---|---|
| D. 291,047 | 7/1987 | Pappas | D7/334 |
| 458,909 | 9/1891 | Lincoln . | |
| 687,250 | 11/1901 | Monfort . | |
| 1,730,345 | 10/1929 | Beman . | |
| 1,919,439 | 7/1933 | Little . | |
| 2,354,941 | 8/1944 | Treitel | 280/36 |
| 2,886,186 | 5/1959 | Hamilton | 211/126 |
| 2,922,529 | 1/1960 | Culbertson . | |
| 2,944,862 | 7/1960 | Heil | 312/237 |
| 3,100,572 | 8/1963 | Gingher et al. . | |
| 3,208,807 | 9/1965 | Becker | 312/200 |
| 3,215,096 | 11/1965 | Holtz | 108/111 |
| 3,289,664 | 12/1966 | Hewitt | 126/37 |
| 3,663,081 | 5/1972 | Williams | 312/236 |
| 3,756,680 | 9/1973 | Lerner | 312/237 |
| 3,811,559 | 5/1974 | Carter | 206/4 |
| 3,915,529 | 10/1975 | Bernier | 312/237 |
| 3,998,332 | 12/1976 | Lambertson | 211/13 |
| 4,092,973 | 6/1978 | Bernazzani | 126/37 |
| 4,188,890 | 2/1980 | de Villers | 108/30 |
| 4,251,044 | 2/1981 | Olson | 248/166 |
| 4,321,873 | 3/1982 | Nealis | 108/91 |
| 4,334,724 | 6/1982 | Rogers, Sr. | 312/280 |
| 4,436,353 | 3/1984 | Tucker | 312/241 |
| 4,580,750 | 4/1986 | Spellman | 248/164 |
| 4,934,280 | 6/1990 | Bae | 108/99 |
| 5,645,259 | 7/1997 | Chen | 248/436 |

FOREIGN PATENT DOCUMENTS 617895  8/1935  Germany .

OTHER PUBLICATIONS

U.S. Patent application Ser. No. 06/591,832.

*Primary Examiner*—Peter M. Cuomo
*Assistant Examiner*—Karlena D. Schwing
*Attorney, Agent, or Firm*—Lewis, D'Amato, Brisbois & Bisgaard LLP

[57] ABSTRACT

A portable modular field kitchen for use in preparing and serving food in the out-of-doors typically employed at camp sights, roadside camping facilities for recreational vehicles, at a city park, the beach-or even on the patio or in the back yard of a residence or other outdoor venue. The portable modular field kitchen includes a horizontal work surface and a main frame for supporting and stabilizing the horizontal work surface. The main frame includes a pair of opposing vertical supports interconnected by a collapsible scissors operator. The scissors operator is connected to each of the vertical supports by a pair of support arms. A pair of side grate tables are each supported by a corresponding one of the opposing vertical supports and one of a pair of side table frames. Each of the side table frames is connected to the corresponding one of the side grate tables by a pair of hinged support bars. A lower grate shelf is supported by the scissors operator located beneath the horizontal work surface for storing kitchen articles. An upper frame section supported by the main frame is utilized to suspend cooking articles above the horizontal work surface. The pair of side grate tables and the lower grate shelf are removably attachable to the main frame and the side table frames by flexible plastic clips.

14 Claims, 3 Drawing Sheets

PORTABLE MODULAR FIELD KITCHEN

BACKGROUND OF THE INVENTION

1. Field of the Invention

The present invention relates to the preparation and serving of food in the out-of-doors. More specifically, the present invention relates to methods and apparatus for a portable modular field kitchen for use with other cooking equipment in preparing and serving food at camp sights, backyard patios and other outdoor venues.

2. Description of the Related Art

The relevant art is directed to outdoor kitchen type devices. The outdoor kitchen devices of the prior art are typically employed for (a) storing food stuffs transported to an outdoor site and for (b) food preparation. The outdoor site can be a campsite for hunting, fishing, hiking, rock climbing, a roadside camping facility for recreational vehicles or any other outdoor activity typically removed from ones residence. In the alternative, the outdoor site can be as local as a barbecue grill located at a city park, the beach or even on the patio or in the back yard of ones residence.

An outdoor field kitchen device known in the prior art included a structure having a top work surface and storage shelves. The field kitchen device was formed entirely from steel tubing and consequently was very heavy, cumbersome and unstable. Thus the field kitchen device was difficult for a woman or small person to transport, assemble and disassemble. Another kitchen type device or campers table included a top work surface comprised of polyethylene which could be removed and replaced with a sink or a portable stove of the type used in a recreational vehicle or tent trailer. Several other outdoor kitchen type devices included a work surface and a sink mounted adjacent to the work surface. Draining water from the sink after use was accomplished by a drain hole which often resulted in creating a pool of water underneath the outdoor kitchen device. Further, the sink was very shallow and consequently was not useful for washing large utensils. Additionally, the outdoor kitchen device was expensive and generally unstable.

Several other outdoor kitchen type devices have been known in the prior art and have been referred to as a compact portable kitchen, kitchen unit, camp stove cabinet, compact field kitchen, field range cabinet, portable storage device table, foldable sink table, compact portable kitchen and the like.

The portable kitchen is contained within a box and, when assembled, stands on four legs and includes multiple shelves and storage areas, a work surface and a cooler box. When disassembled, the portable kitchen box fits into a standard trailer or the back of a station wagon.

The kitchen unit includes the main kitchen features, i.e., a sink, a stove unit located within a countertop, an icebox and a dish rack located within a cabinet for outdoor use. Water is pumped by pressure out of a faucet and a separate bottle collects drain water. The stove utilizes butane gas from a portable container for fuel and the icebox utilizes stored ice as a cooling medium.

The camp stove cabinet comprises a cabinet having a top surface that serves to support a portable gas stove powered by a bottled flammable gas. The top surface also serves as a work surface. A pair of multiple tier cabinets having hinged doors are located underneath the top surface.

The compact field kitchen is also box-shaped and stands upon four legs when assembled. The main portion of the field kitchen includes a sink and a stove fueled by a bottled flammable gas. A vertical portion includes a plurality of storage cabinets and a direct current source is employed to power a fluorescent lamp. When disassembled, the entire field kitchen collapses into a portable box.

The field range cabinet is a portable out-of-doors cooking apparatus having a removable outer shell. The outer shell is capable of easy and quick locking and unlocking with respect to the frame of the field range cabinet and easy removal from the frame to facilitate cleaning of the interior walls. The interior of the field range cabinet also includes horizontal and vertical support elements of the frame to contain the contents of what is being cooked.

The portable storage device and table for use in outdoor activities unfolds from a trunk-like container into a table. The storage device and table have a front shelf space which foldably lifts from the container providing support for the table surface. The trunk-like base provides a storage receptacle for articles.

The foldable sink table includes a top work surface located adjacent to a sink. The sink table includes four vertical legs including a storage space underneath the work surface. Mounted above the work surface are shelves and mounted adjacent to the sink table is another large work surface.

Finally, the compact portable kitchen includes a box-shaped apparatus on wheels having an upper surface completely covered by multiple cooking devices such as a range, a grill and a deep pan fryer. Beneath the top surface is a storage drawer and underneath the drawer is a storage shelf. Mounted above the top surface is a hood including a ventilation fan. The compact portable kitchen clearly requires a source of electricity to power the cooking apparatus.

Thus, there is a need in the art for a portable modular field kitchen that comprises a lightweight, rigid aluminum frame, assembles and disassembles quickly and easily without the use of tools, includes a main work surface that is located at standard countertop height, includes a pair of side tables located at standard table height for accommodating the serving of meals and the support of cooking equipment where the side tables are comprised of grates for allowing spillage to escape, includes a pair of lantern holders, and the collapsed modular field kitchen is insertable into a waterproof carrying case.

SUMMARY OF THE INVENTION

Briefly, and in general terms, the present invention provides a new and improved portable modular field kitchen for use in preparing and serving food in the out-of-doors. The novel and non-obvious portable modular field kitchen exhibits a robust lightweight design including an aluminum frame and steel grate tables and shelves. The field kitchen is assembled and disassembled quickly and easily since tools are not required. The horizontal work surface is positioned at the standard countertop height of 36" above ground level to facilitate food preparation and the side grate tables are positioned at 28" above ground level to facilitate eating meals. The side grate tables allow spilled items to fall through to the ground. When disassembled, the field kitchen is transported and stored in a waterproof carrying enclosure.

The present invention is generally directed to a portable modular field kitchen for use in preparing and serving food in the out-of-doors typically employed at, for example, camp sights, roadside camping facilities for recreational vehicles, at a city park, the beach or even on the patio or in the back yard of a residence or other outdoor venue. In its most fundamental embodiment, the portable modular field kitchen comprises a construction incorporating a plurality of features including a horizontal work surface and a main frame for supporting and stabilizing the horizontal work surface. The main frame comprises a pair of opposing vertical supports interconnected by a collapsible scissors operator. The scissors operator is connected to each of the vertical supports by a pair of support arms. A pair of side grate tables are each supported by a corresponding one of the opposing vertical supports and one of a pair of side table frames. Each of the side table frames is connected to the corresponding one of the side grate tables by a pair of hinged support bars. A lower grate shelf is supported by the scissors operator located beneath the horizontal work surface for storing kitchen articles. An upper frame section supported by the main frame is utilized to suspend cooking articles above the horizontal work surface.

In a preferred embodiment, the portable modular field kitchen includes a plurality of flexible plastic clips attached to the pair of side grate tables and the lower grate shelf. The flexible plastic clips facilitate the removable attachment of the side grate tables to the opposing vertical supports and the side table frames and of the lower grate shelf to the scissors operator. The weight of the collapsible scissors operator is borne by the pair of support arms and each of the hinged support bars of the side table frames includes one of a plurality of first hooks for attaching to the corresponding side grate table. An upper frame section comprises a plurality of second hooks for suspending cooking articles and a plurality of third hooks for suspending camping equipment.

These and other objects and advantages of the present invention will become apparent from the following more detailed description, taken in conjunction with the accompanying drawings which illustrate the invention, by way of example.

DESCRIPTION OF THE INVENTION

Figure 1:
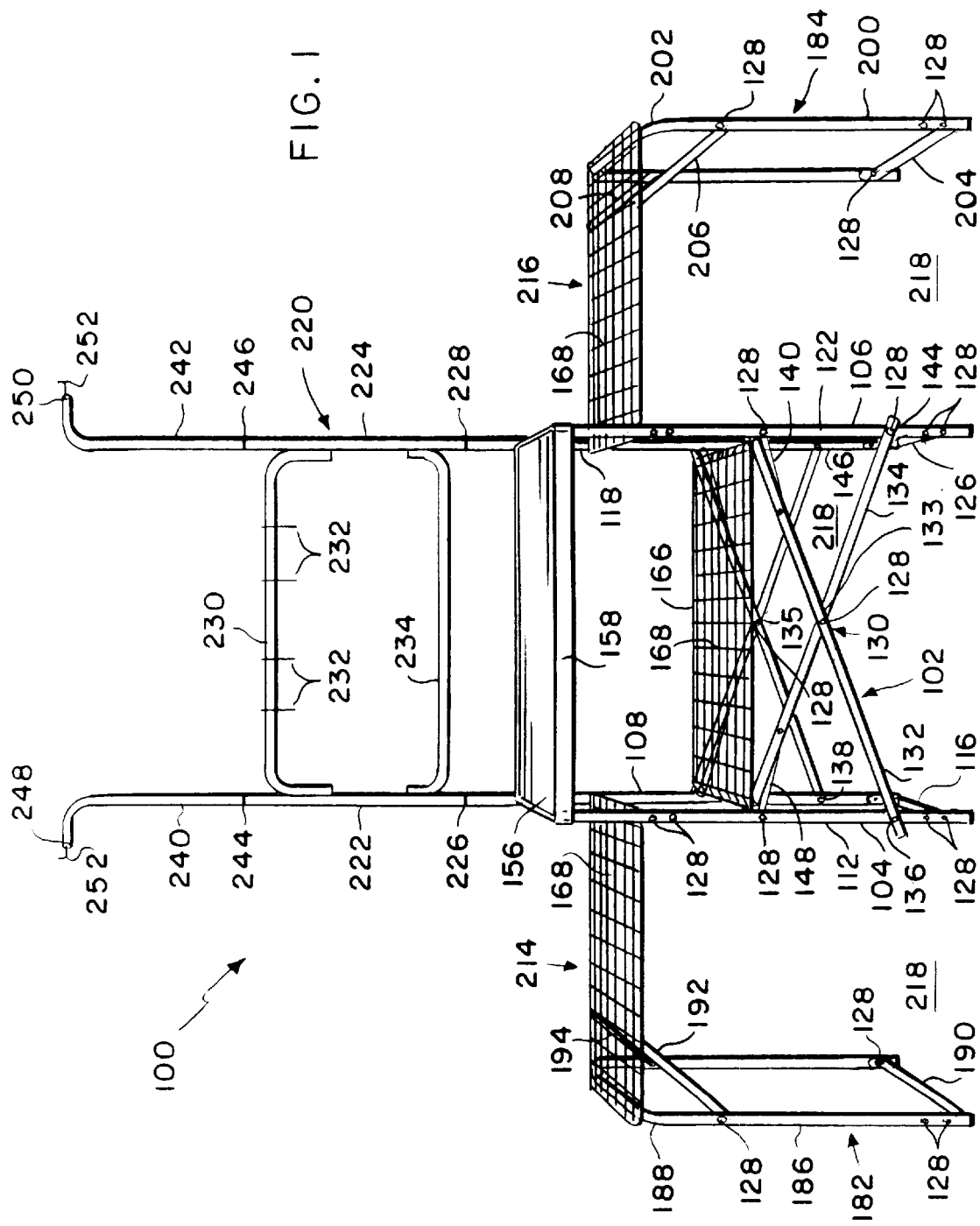
FIG. 1 is a frontal perspective view of a portable modular field kitchen of the present invention showing an upper frame support extending above a food preparation work surface, a food storage shelf mounted above a collapsible scissors frame and a pair of side shelves extending laterally from said food preparation work surface.

The present invention is a portable modular field kitchen 100 as best shown in FIG. 1 for use in preparing and serving food in the out-of-doors. The field kitchen 100 of the present invention serves as an outdoor kitchen organizer by providing a situs to organize and utilize cooking utensils and equipment (including cooking equipment) for the storing, preparing and serving of food. The portable modular field kitchen 100 is typically employed at camp sights, roadside camping facilities for recreational vehicles, at the city park, the beach or even on the patio or in the back yard of a residence or other outdoor venue.

A preferred embodiment of the portable modular field kitchen 100 is shown in FIGS. 1–5 and includes a main frame 102 having an aluminum tubular structure. The function of the main frame 102 is to support a plurality of working and storage surfaces that will be described in more detail hereinbelow. The main frame 102 comprises a pair of opposing vertical supports including a first opposing vertical support 104 and a second opposing vertical support 106 shown best in FIG. 2. The first opposing vertical support 104 includes a first rear stanchion 108. Attached to the first rear stanchion 108 is a first top horizontal cross piece 110 which upon being downwardly angled at approximately 90° becomes a first front vertical frame member 112. The first opposing vertical support 104 also includes a first middle horizontal cross bar 114 and a first lower support cross bar 116.

Figure 2:
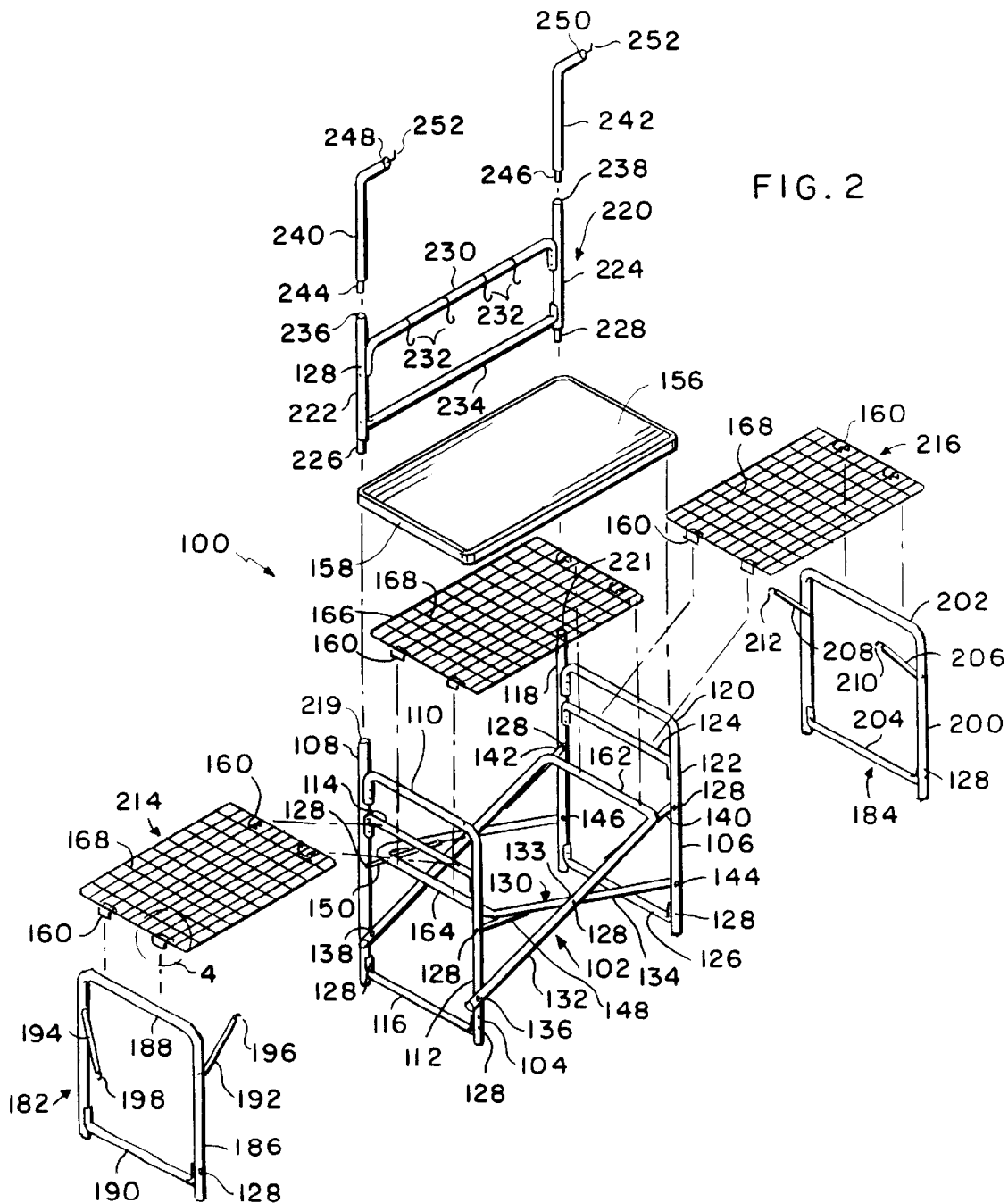
FIG. 2 is an exploded view of the portable modular field kitchen showing the upper frame support separated from the food preparation work surface, and the food storage shelf and the pair of side shelves each separated from the collapsible scissors frame.
Figure 3:
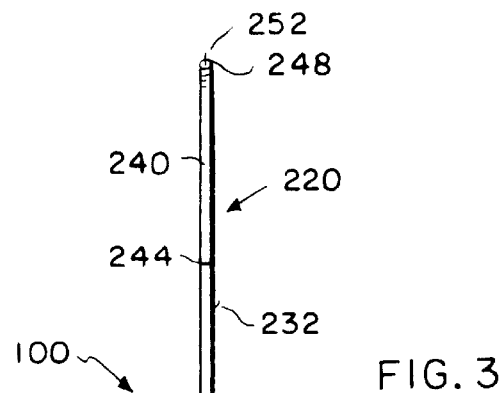
FIG. 3 is a side elevation view of the portable modular field kitchen showing the upper frame support, the food preparation work surface, one of the pair of side shelves, the food storage shelf and portions of the collapsible scissors frame.

Likewise, the second opposing vertical support 106 includes a second rear stanchion 118. Attached to the second rear stanchion 118 is a second top horizontal cross piece 120 which upon being downwardly angled at approximately 90° becomes a second front vertical frame member 122. The second opposing vertical support 106 also includes a second middle horizontal cross bar 124 and a second lower support cross bar 126. Each of these structural components are best shown in FIG. 2. It is noted that the first middle horizontal cross bar 114 and the first lower support cross bar 116 of the first opposing vertical support 104 and the second middle horizontal cross bar 124 and the second lower support cross bar 126 of the second opposing vertical support 106 each provide structural integrity to the main frame 102. Further, each of the aluminum tubes of the main frame 102 are rotatively attached by a mechanical fastener 128 such as, for example, a rivet or a threaded screw as shown in FIGS. 1 and 2.

Figure 5:
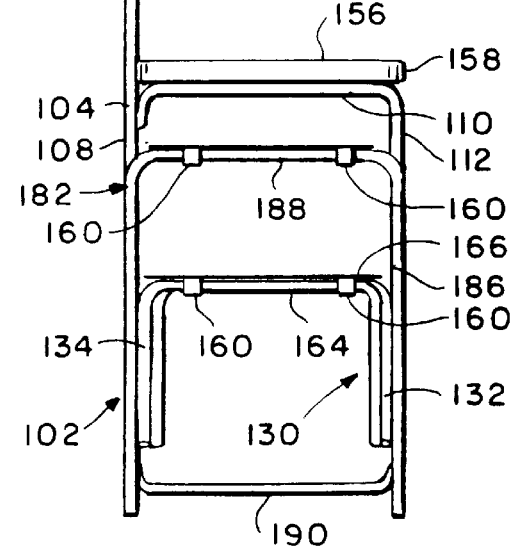
FIG. 5 is a perspective view of the portable modular field kitchen of FIG. 1 shown partially disassembled in preparation of insertion into a waterproof carrying case.
Figure 5:
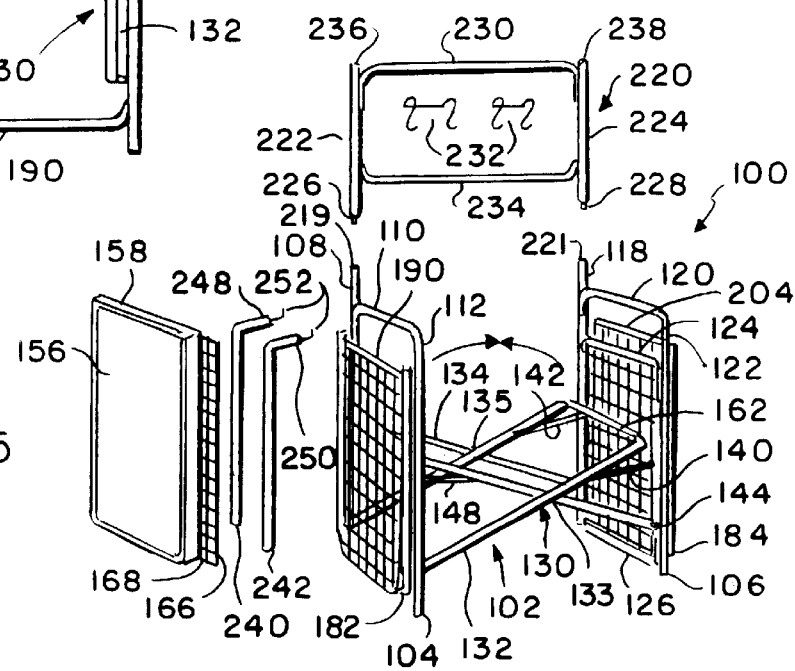

The first opposing vertical support 104 and the second opposing vertical support 106 are connected together by a collapsible scissors operator 130 as shown in FIGS. 1 and 2. The scissors operator 130 is designed to fold upon itself for enabling the entire main frame 102 to collapse as indicated in FIG. 5. The collapsed main frame 102 is then deposited into a waterproof carrying case (not shown) for transport and storage. During use, the main frame 102 (along with the other components of the portable modular field kitchen 100) is then retrieved from the waterproof carrying case (not shown) and erected for use in supporting the field kitchen 100 as shown in FIG. 1 and as described hereinbelow.

The collapsible scissors operator 130 is comprised of a first U-shaped member 132 and a second U-shaped member 134 as is clearly shown in FIG. 2. A mechanical fastener 128 such as a rivet is employed to affix the first U-shaped member 132 to the second U-shaped member 134 at the two points of intersection 133 and 135, respectively, as is shown best in FIG. 1. The mechanical fastener 128 is installed to be sufficiently snug to bind the two U-shaped members 132 and 134 together but yet enable the two U-shaped members 132 and 134 to rotate with respect to one another. This type of connection in which the components are securely affixed but still free to rotate with respect to one another is referred to as being rotatively attached.

The two U-shaped members 132 and 134 are also each connected to both the first and second opposing vertical supports 104 and 106. In particular, the first U-shaped member 132 is connected to the first opposing vertical support 104 at points 136 and 138 by mechanical fasteners 128 as shown in FIG. 1 and 2. Further, the first U-shaped member 132 is also connected to the second opposing vertical support 106 via a first pair of support arms 140 and 142. The support arms 140 and 142 are metal connectors, preferably aluminum, that are each rotatively attached to the first U-shaped member 132 and to the second opposing vertical support 106 via mechanical fasteners 128 such as rivets. Thus, the support arms 140 and 142 are capable of rotative movement when the scissors operator 130 is erected or collapsed.

Likewise, the second U-shaped member 134 is connected to the second opposing vertical support 106 at points 144 and 146 by mechanical fasteners 128 as shown in FIGS. 1 and 2. Further, the second U-shaped member 134 is also connected to the first opposing vertical support 104 via a second pair of support arms 148 and 150. The support arms 148 and 150 are metal connectors, preferably aluminum, that are each rotatively attached to the second U-shaped member 134 and to the first opposing vertical support 104 via mechanical fasteners 128 such as rivets as shown best in FIG. 2. With this construction, the first and second opposing vertical supports 104 and 106 are capable of moving closer to or further from each other by the scissors-type movement of the scissors operator 130.

When the main frame 102 is removed from the waterproof carrying case, it is positioned so that the bottoms of the first rear stanchion 108 and second rear stanchion 118 and the bottoms of the first front vertical frame member 112 and the second front vertical frame member 122 are positioned at ground level. Then the first U-shaped member 132 and second U-shaped member 134 of the scissors operator 130 are grasped and forced apart. The separation motion continues until the first U-shaped member 132 snaps onto the first pair of support arms 140 and 142 and the second U-shaped member 134 snaps onto the second pair of support arms 148 and 150. Under these conditions, the support arms 140 and 142 support the weight of and on the first U-shaped member 132 while the support arms 148 and 150 support the weight of and on the second U-shaped member 134. In order to collapse the main frame 102, the preceding described steps are practiced in reverse order.

The main frame 102 as described hereinabove is utilized to support and stabilize a plurality of work or utility surfaces. Mounted upon the first top horizontal crosspiece 110 of the first opposing vertical support 104 and upon the second top horizontal crosspiece 120 of the second opposing vertical support 106 is a horizontal work surface 156 shown in FIGS. 1 and 2. The work surface 156 is a solid horizontal plane having a short orthogonal skirt 158 surrounding the perimeter thereof and is mounted at the standard kitchen countertop height of 36" above ground level. The work surface 156 is intended to be a top horizontally positioned table for use in food preparation and the like. Any suitable material can be used to fabricate the work surface 156 including wood or wood products, a lightweight metal or any suitable synthetic material. The horizontal work surface 156 is attached to the first top horizontal crosspiece 110 and the second top horizontal crosspiece 120 by a plurality of flexible plastic clips 160. The short orthogonal skirt 158 can be comprised of any suitable material such as metal. The flexible plastic clips 160 can be mounted to the short orthogonal skirt 158 and underneath the horizontal work surface 156 so that they are hidden from view in FIGS. 1 and 2.

Mounted upon a first U-shaped end 162 of the first U-shaped member 132 and upon a second U-shaped end 164 of the second U-shaped member 134 of the scissors operator 130 is a lower grate shelf 166 as best shown in FIGS. 1 and 2. The lower grate shelf 166 is mounted directly underneath the horizontal work surface 156 and comprises a framework of parallel bars or wires 168 fashioned from steel. The lower grate shelf 166 is utilized for the storage of kitchen articles, cookware, packaged food items and any other article useful in a kitchen. The lower grate shelf 166 also utilizes a plurality of the flexible plastic clips 160 to achieve a snug attachment to the first and second U-shaped ends 162 and 164. It can clearly be seen in FIG. 2 that four of the flexible plastic clips 160 are attached to the bottom edge of the lower grate shelf 166. In addition, the flexible clips 160 are also employed to attach other utility surfaces to components of the main frame 102 which will be discussed hereinbelow. The details of a suitable flexible plastic clip 160 will now be described.

Figure 4:
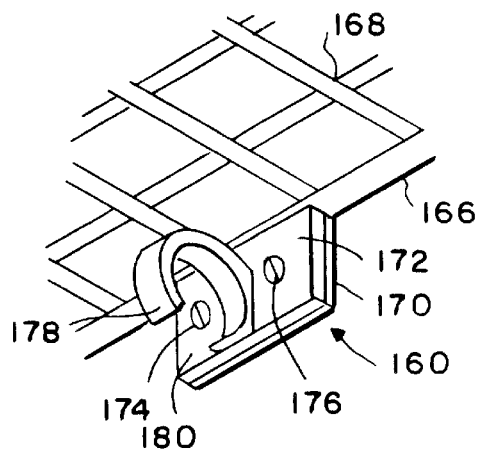
FIG. 4 is a detail diagram, in perspective, of a flexible snap-on clip utilized to facilitate the rapid assembly and disassembly of the modular components of the portable modular field kitchen.

FIG. 4 shows a detail drawing of a suitable example of the flexible plastic clip 160 utilized with the horizontal work surface 156, the lower grate shelf 166 and other utility surfaces attached to the main frame 102. For purposes of illustration, the flexible plastic clip 160 is shown structurally attached to the bottom surface of the lower grate shelf 166. However, the same construction is useful in attaching the flexible plastic clip 160 to the short orthogonal skirt 158 of the horizontal work surface 156 shown in FIGS. 1 and 2. The flexible plastic clip 160 is attached to a frame extension 170 which can be comprised of metal, preferably steel, and which is affixed (such as by welding, fasteners or other suitable means) to the bottom edge of the lower grate shelf 166. It is noted that the frame extension 170 can also be fastened to the perimeter of the metallic short orthogonal skirt 158 of the horizontal work surface 156 notwithstanding the material that the work surface 156 is comprised of.

The frame extension 170 includes a pair of threaded holes (not shown) formed therein. The flexible plastic clip 160 includes a plastic rectangular base 172 having a pair of penetrations 174 formed therethrough which are congruent with the threaded holes (not shown) formed in the frame extension 170. A pair of threaded fasteners 176 are passed through the penetrations 174 of the rectangular base 172 and threaded into the pair of threaded holes (not shown) in the frame extension 170. Extending from the plastic rectangular base 172 is a flexible rolled arm 178. Formed between the rolled arm 178 and the rectangular base 172 is an opening or mouth 180 suitably sized for forcing the rolled arm 178 over the round aluminum tubes which comprise the first U-shaped end 162 and the second U-shaped end 164 of the collapsible scissors operator 130. Likewise, the flexible rolled arm 178 of the plastic clips 160 attached to the bottom of the horizontal work surface 156 can be forced over the round aluminum tubes that comprise the first top horizontal crosspiece 110 and the second top horizontal crosspiece 120. Thus, the flexible plastic clip 160 securely attaches the lower grate shelf 166, the horizontal work surface 156 and other suitable utility surfaces (described hereinbelow) to the main frame 102.

Positioned laterally adjacent to the main frame 102 is a pair of side table frames comprising a first side table frame 182 and a second side table frame 184. The first side table frame 182 includes a first frame U-shaped member 186 having a first frame U-shaped end 188 and a first frame lower support crossbar 190 best shown in FIG. 2. The lower support crossbar 190 is employed to provide structural integrity to the first side table frame 182. The first side table frame 182 also includes a pair of hinged support bars comprising a first hinged support bar 192 and a second hinged support bar 194. Each of the first and second hinged support bars 192 and 194 are rotatively attached to the first frame U-shaped member 186 with one of the mechanical fasteners 128 such as a rivet. This arrangement enables the first and second hinged support bars 192 and 194 to rotate about the rivet 128. The first hinged support bar 192 further includes a first end hook 196 and the second hinged support bar 194 further includes a second end hook 198 best shown in FIG. 2.

The second side table frame 184 includes a second frame U-shaped member 200 having a second frame U-shaped end 202 and a second frame lower support crossbar 204 best shown in FIG. 2. The lower support crossbar 204 is employed to provide structural integrity to the second side table frame 184. The second side table frame 184 also includes a pair of hinged support bars comprising a third hinged support bar 206 and a fourth hinged support bar 208. Each of the third and fourth hinged support bars 206 and 208 are rotatively attached to the second frame U-shaped member 200 with a mechanical fastener 128 such as a rivet. This arrangement enables the third and fourth hinged support bars 206 and 208 to rotate about the rivet 128. The third hinged support bar 206 further includes a third end hook 210 and the fourth hinged support bar 208 further includes a fourth end hook 212 best shown in FIG. 2.

Mounted upon the first frame U-shaped end 188 of the first side table frame 182 and upon the first middle horizontal cross bar 114 of the first opposing vertical support 104 is a first side grate table 214. Likewise, mounted upon the second frame U-shaped end 202 of the second side table frame 184 and upon the second middle horizontal cross bar 124 of the second opposing vertical support 106 is a second side grate table 216. The first side grate table 214 and the second side grate table 216 each comprise a framework of parallel bars or wires 168 fashioned from steel in the same manner as the lower grate shelf 166 previously described and shown in FIGS. 1, 2 and 4.

Each of the first and second side grate tables 214 and 216 also utilize a plurality of the flexible plastic clips 160. The flexible plastic clips 160 are employed to achieve a snug attachment to the first frame U-shaped end 188 of the first side table frame 182 and the first middle horizontal cross bar 114 of the first opposing vertical support 104. The flexible plastic clips 160 are also employed to achieve a snug attachment to the second frame U-shaped end 202 of the second side table frame 184 and the second middle horizontal cross bar 124 of the second opposing vertical support 106. It can clearly be seen in FIG. 2 that four of the flexible plastic clips 160 are attached to the bottom edge of each of the first side grate table 214 and the second side grate table 216.

The structure and operation of the flexible plastic clips 160 as they relate to the first and second side grate tables 214 and 216 is duplicate to that previously described with respect to FIG. 4. Each of the flexible plastic clips 160 is attached, as with threaded screws, to a frame extension 170 affixed to the bottom surface of the first and second grate tables 214 and 216 in a manner duplicate to that described with respect to the lower grate shelf 166 shown in FIG. 4. The opening or mouth 180 formed in the flexible rolled arm 178 of the plastic clip 160 is then forced over the aluminum tubes of the first and second side table frames 182 and 184 and over the first and second middle horizontal cross bars 114 and 124.

To provide further stability, the first and second hinged support bars 192 and 194 of the first side table frame 182 are rotated upward to contact the bottom surface of the first side grate table 214. Then, the first and second end hooks 196 and 198 of the hinged support bars 192 and 194 are attached to the parallel bars 168 of the first side grate table 214 as is shown in FIGS. 1 and 2. Likewise the third and fourth hinged support bars 206 and 208 of the second side table frame 184 are rotated upward to contact the bottom surface of the second side grate table 216. Then, the third and fourth end hooks 210 and 212 of the hinged support bars 206 and 208 are attached to the parallel bars 168 of the second side grate table 216 as is also shown in FIGS. 1 and 2. In this manner, each of the side grate tables 214 and 216 are secured in position.

Each of the first and second side grate tables 214 and 216 is typically utilized for serving meals since the side grate tables 214 and 216 are positioned at table height, i.e., 28" above ground level. However, the side grate tables 214 and 216 can also be used to support a portable cooking appliance (not shown) of the flammable gas or charcoal briquette variety. Further, either of the side grate tables 214 or 216 can be utilized for the storage of kitchen articles, cookware, packaged food items and any other article useful in a kitchen. Further, the spaces designated by the number 218 underneath the first and second side grate tables 214 and 216 and underneath the main frame 102 can be used for additional storage for such items as, for example, an ice chest, backpacks or trash containers.

The first rear stanchion 108 and the second rear stanchion 118 serve as the rear vertical supports of the main frame 102 as is best shown in FIG. 2. The first and second rear stanchions 108 and 118, respectively, are comprised of an aluminum tubular (i.e., hollow) structure which is open at the top ends 219 and 221, thereof. Mounted upon the first and second rear stanchions 108 and 118, respectively, is an upper frame section 220 as shown in FIGS. 1 and 2. The upper frame section 220 includes a first vertical member 222 and a second vertical member 224. Both the first vertical member 222 and the second vertical member 224 are each swedged on the corresponding bottom ends 226 and 228 thereof (where swedging is the process of compressing one end of a standard size aluminum tube to snugly fit into the open end of another length of the same standard size aluminum tubing). The swedged bottom ends 226 and 228 are then fitted into the open top ends 219 and 221, respectively, of the first rear stanchion 108 and the second rear stanchion 118, respectively. This arrangement provides support to the upper frame section 220 as shown in FIG. 1.

Located between the first vertical member 222 and the second vertical member 224 is an upper cross arm 230. A plurality of first utility hooks 232 are suspended from the upper cross arm 230 for enabling various kitchen tools to be attached thereto. The upper cross arm 230 is securely attached to the first vertical member 222 and the second vertical member 224 by a mechanical fastener 128 such as a rivet. Also connected between the first vertical member 222 and the second vertical member 224 is an upper support cross bar 234. The upper support cross bar 234 provides additional structural integrity to the upper frame section 220 and is retained in position by a plurality of mechanical fasteners 128 such as rivets.

The first vertical member 222 and the second vertical member 224 (like each of the components of the main frame 102) are also comprised of an aluminum tubular (i.e., hollow) structure. Further, the first vertical member 222 includes an open top 236 and the second vertical member 224 includes an open top 238 as shown in FIG. 2. Mounted upon the first vertical member 222 is a third vertical member 240 and mounted upon the second vertical member 224 is a fourth vertical member 242. Both the third vertical member 240 and the fourth vertical member 242 are each swedged on the corresponding bottom ends 244 and 246 thereof best shown in FIG. 2. The swedged bottom ends 244 and 246 are then fitted into the open top ends 236 and 238, respectively, of the first vertical member 222 and the second vertical member 224, respectively. This arrangement provides additional support to the upper frame section 220 as shown in FIGS. 1 and 2.

The third vertical member 240 includes a top terminal end 248 and the fourth vertical member 242 includes a top terminal end 250. Each of the top terminal ends 248 and 250, respectively, are positioned at an angle with respect to the third vertical member 240 and the fourth vertical member 242. Extending outward from the tip of the top terminal end 248 is a first of a pair of second utility hooks 252 and extending outward from the tip of the top terminal end 250 is a second of the pair of second utility hooks 252. The pair of second utility hooks 252 are employed to suspend a pair of lanterns or baskets of food products and spices such as fruit, vegetables and/or garlic.

The present invention provides novel advantages over other field kitchen type devices known in the art. The main advantages of the portable modular field kitchen 100 include that it exhibits a robust lightweight design including an aluminum main frame 102, a steel lower grate shelf 166 and steel side grate tables 214 and 216. The field kitchen 100 is assembled and disassembled quickly and easily since tools are not required. The horizontal work surface 156 is positioned at the standard countertop height of 36" above ground level to facilitate food preparation and the side grate tables 214 and 216 are positioned at 28" above ground level to facilitate eating meals. The side grate tables 214 and 216 allow spilled items to fall through to the ground. When disassembled, the field kitchen 100 is transported and stored in a waterproof carrying enclosure (not shown).

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such modifications, applications and embodiments within the scope of the present invention. Accordingly,

What is claimed is:

1. A portable modular field kitchen comprising:
   a horizontal work surface;
   a main frame for supporting and stabilizing said horizontal work surface, said main frame comprising a pair of opposing vertical supports interconnected by a collapsible scissors operator, said scissors operator connected to each of said vertical supports by a pair of support arms;
   a pair of side grate tables each supported by a corresponding one of said opposing vertical supports and one of a pair of side table frames, each of said side table frames being connected to the corresponding one of said side grate tables by a pair of hinged support bars;
   a lower grate shelf supported by said scissors operator located beneath said horizontal work surface for storing kitchen articles; and
   an upper frame section supported by said main frame for suspending cooking articles above said horizontal work surface.

2. The portable modular field kitchen of claim 1 wherein said horizontal work surface is positioned at a height of thirty-six inches.

3. The portable modular field kitchen of claim 1 wherein said pair of side grate tables are positioned at a the height of twenty-eight inches.

4. The portable modular field kitchen of claim 1 wherein said pair of support arms bear the weight of said collapsible scissors operator.

5. The portable modular field kitchen of claim 1 further including a plurality of flexible plastic clips for connecting said side grate tables to said opposing vertical supports and said side table frames and for connecting said lower grate shelf to said scissors operator.

6. The portable modular field kitchen of claim 5 wherein said plurality of flexible plastic clips includes a rolled arm having an opening for receiving a round tube.

7. The portable modular field kitchen of claim 6 wherein said plurality of flexible plastic clips are each attached to a frame extension by a plurality of threaded screws.

8. The portable modular field kitchen of claim 1 wherein said main frame, said side table frames and said upper frame section are each comprised of aluminum.

9. The portable modular field kitchen of claim 1 wherein said pair of side grate tables and said lower grate shelf are comprised of steel.

10. The portable modular field kitchen of claim 1 wherein each of said hinged support bars of said side table frames includes one of a plurality of first hooks for attaching to said corresponding side grate table.

11. The portable modular field kitchen of claim 1 wherein said upper frame section comprises a plurality of second hooks for suspending said cooking articles and a plurality of third hooks for suspending camping equipment.

12. The portable modular field kitchen of claim 1 wherein said collapsible scissors operator comprises a first U-shaped member and a second U-shaped member, said first U-shaped member being connected to a first of said opposing vertical supports and said corresponding support arms and said second U-shaped member being connected to a second of said opposing vertical supports and said corresponding support arms, said first U-shaped member and said second U-shaped member being hinged together.

13. A portable modular field kitchen comprising:
   a horizontal work surface;
   a main frame for supporting and stabilizing said horizontal work surface, said main frame comprising a first opposing vertical support and a second opposing vertical support, said first and second opposing vertical supports being interconnected by a collapsible scissors operator, said collapsible scissors operator comprising a first U-shaped member and a second U-shaped member, said first U-shaped member being connected to said first opposing vertical support and a first pair of support arms and said second U-shaped member being connected to said second opposing vertical support and a second pair of support arms, said first U-shaped member and said second U-shaped member being hinged together;
   a pair of side grate tables each supported by a corresponding one of said first and second opposing vertical supports and one of a pair of side table frames, each of said side table frames being connected to the corresponding one of said side grate tables by a pair of hinged support bars;

a lower grate shelf supported by said scissors operator beneath said horizontal work surface for storing kitchen articles; and an upper frame section supported by said main frame for suspending cooking articles above said horizontal work surface.

14. A portable modular field kitchen comprising:

a horizontal work surface;

a main frame for supporting and stabilizing said horizontal work surface, said main frame comprising a pair of opposing vertical supports interconnected by a collapsible scissors operator, said scissors operator connected to each of said vertical supports by a pair of support arms;

a pair of side grate tables each supported by a corresponding one of said opposing vertical supports and one of a pair of side table frames, each of said side table frames being connected to the corresponding one of said side grate tables by a pair of hinged support bars;

a lower grate shelf supported by said scissors operator beneath said horizontal work surface for storing kitchen articles;

a plurality of flexible plastic clips for connecting said side grate tables to said opposing vertical supports and said side table frames and for connecting said lower grate shelf to said scissors operator; and an upper frame section supported by said main frame for suspending cooking articles above said horizontal work surface.

* * * * *